US012651397B2

(12) United States Patent
Bradley et al.

(10) Patent No.: US 12,651,397 B2
(45) Date of Patent: Jun. 9, 2026

(54) GRAPH SIMULATION FOR FACIAL MICRO FEATURES VIA PRE-COMPUTED DISPLACEMENT TEXTURE MAPS

(71) Applicant: DISNEY ENTERPRISES, INC., Burbank, CA (US)

(72) Inventors: Derek Edward Bradley, Zürich (CH); Prashanth Chandran, Zürich (CH); Sebastian Klaus Weiss, Zürich (CH); Gaspard Zoss, Zürich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 1 day.

(21) Appl. No.: 18/628,611

(22) Filed: Apr. 5, 2024

(65) Prior Publication Data

US 2024/0346734 A1 Oct. 17, 2024

Related U.S. Application Data

(60) Provisional application No. 63/617,046, filed on Jan. 2, 2024, provisional application No. 63/495,535, filed on Apr. 11, 2023.

(51) Int. Cl.
    *G06T 13/40* (2011.01)
    *G06T 17/20* (2006.01)

(52) U.S. Cl.
    CPC .............. *G06T 13/40* (2013.01); *G06T 17/20* (2013.01)

(58) Field of Classification Search
    CPC ......... G06T 13/40; G06T 15/40; G06T 17/20; G06T 15/04
    See application file for complete search history.

(56) References Cited

U.S. PATENT DOCUMENTS 9,563,737 B1 2/2017 Arkhipov et al.
2001/0033675 A1* 10/2001 Maurer ................... G06T 7/262
                                                                    382/103

(Continued)

OTHER PUBLICATIONS

Australian Office Action received for Application No. 2024202285 dated Feb. 25, 2025, 6 pages.

(Continued)

*Primary Examiner* — Michelle Chin
(74) *Attorney, Agent, or Firm* — Squire Patton Boggs LLP; Sarah Mirza

(57) ABSTRACT

The present invention sets forth a technique for simulating wrinkles under dynamic facial expression. The technique includes receiving a wrinkle graph, including a plurality of nodes associated with a plurality of pores included in a three-dimensional (3D) representation of a facial structure and a plurality of edges associated with a plurality of wrinkles included in the 3D representation of a facial structure. The technique also includes assigning one or more of the plurality of wrinkles associated with edges in the wrinkle graph to one of a plurality of bins and generating, for each of the bins, a plurality of pre-computed displacement texture maps. The technique further includes generating a per-frame displacement texture map and modifying an animation frame based on the per-frame displacement texture map, such that the modified animation frame depicts the plurality of pores and the plurality of wrinkles included in the 3D representation of the facial structure.

20 Claims, 7 Drawing Sheets

(56)                References Cited

U.S. PATENT DOCUMENTS

| | | | |
|---|---|---|---|
| 2005/0248582 A1 | 11/2005 | Scheepers et al. | |
| 2008/0312095 A1 | 12/2008 | Kirovski et al. | |
| 2009/0028380 A1* | 1/2009 | Hillebrand | G06T 7/33 |
| | | | 382/100 |
| 2010/0033492 A1* | 2/2010 | Stewart | G06T 11/001 |
| | | | 345/584 |
| 2011/0082670 A1 | 4/2011 | Mcauley et al. | |
| 2011/0310114 A1 | 12/2011 | Choi et al. | |
| 2015/0371135 A1 | 12/2015 | Sandeep et al. | |
| 2016/0055682 A1 | 2/2016 | Luo et al. | |
| 2016/0070967 A1 | 3/2016 | Du et al. | |
| 2017/0024907 A1 | 1/2017 | Bermano et al. | |
| 2019/0156564 A1 | 5/2019 | Tung | |
| 2021/0241526 A1* | 8/2021 | Padovani | G06T 17/20 |
| 2021/0359915 A1 | 11/2021 | Ohlsson et al. | |
| 2022/0392141 A1 | 12/2022 | Fu et al. | |
| 2023/0051312 A1 | 2/2023 | Catana Salazar et al. | |
| 2025/0191404 A1 | 6/2025 | Fan et al. | |

OTHER PUBLICATIONS

Australian Office Action received for Application No. 2024202288 dated Mar. 24, 2025, 7 pages.

Antini et al., "3D Face Identification Based on Arrangement of Salient Wrinkles", IEEE International Conference on Multimedia and Expo, DOI: 10.1109/ICME.2006.262556, Jul. 2006, pp. 85-88.

Alqatawneh et al., "3D Modelling, Simulation and Prediction of Facial Wrinkles", Journal of Communication and Computer, vol. 11, doi: 10.17265/1548-7709/2014.04 005, 2014, pp. 365-370.

Raman et al., "Mesh-Tension Driven Expression-Based Wrinkles for Synthetic Faces", arXiv:2210.03529, Oct. 11, 2022, 18 pages.

Asadi et al., "An Alternative Softmax Operator for Reinforcement Learning", Proceedings of the 34th International Conference on Machine Learning, vol. 70, 2017, 10 pages.

Bickel et al., "Multi-Scale Capture of Facial Geometry and Motion", doi: 10.1145/1275808.1276419; doi:10.1145/1276377.1276419, Proceedings International Conference on Computer Graphics and Interactive Techniques, Aug. 5-9, 2007, 11 pages.

Beeler et al., "High-Quality Single-Shot Capture of Facial Geometry", ACM Transactions on Graphics, DOI 10.1145/1778765. 1778777, vol. 29, No. 4, Article 40, Jul. 2010, pp. 40:1-40:9.

Bando et al., "A Simple Method for Modeling Wrinkles on Human Skin", 10th Pacific Conference on Computer Graphics and Applications, 2002, 10 pages.

Bazin et al., "Longitudinal Study Of Skin Aging: From Microrelief to Wrinkles", 2011, vol. 17, No. 2 pp. 135-140.

Balu et al., "Rapid Mesoscale Multiphoton Microscopy of Human Skin", Biomedical Optics Express, http://dx.doi.org/10.1364/BOE. 7.004375, vol. 7, No. 11, Oct. 3, 2016, 13 pages.

Bowers et al., "Parallel Poisson Disk Sampling with Spectrum Analysis on Surfaces", ACM Transactions on Graphics, 2010, 10 pages.

Cao et al., "Real-Time High-Fidelity Facial Performance Capture", ACM Transactions on Graphics, DOI: http://dx.doi.org/10.1145/ 2766943, vol. 34, No. 4, Article 46, Aug. 2015, pp. 46:1-46:9.

Corcuff et al., "A Fully Automated System to Study Skin Surface Patterns", International Journal of Cosmetic Science, vol. 6, 1984, pp. 167-176.

Cao et al., "Stereoscopic Flash and No-Flash Photography for Shape and Albedo Recovery", IEEE/CVF Conference on Computer Vision and Pattern Recognition, 2020, pp. 13430-3439.

Efros et al., "Image Quilting for Texture Synthesis and Transfer", Siggraph, Aug. 12-17, 2001, pp. 341-346.

Flynn et al., "Simulating the Wrinkling and Aging of Skin with a Multi-Layer Finite Element Model", Journal of Biomechanics, doi: 10.1016/j.jbiomech.2009.10.007, vol. 43, 2010, pp. 442-448.

Ghosh et al., "Multiview Face Capture using Polarized Spherical Gradient Illumination", ACM Transactions on Graphics, DOI 10.1145/ 2024156.2024163, vol. 30, No. 6, Article 129, Dec. 2011, pp. 129:1-129:10.

Golovinskiy et al., "A Statistical Model for Synthesis of Detailed Facial Geometry", doi: 10.1145/1141911.1141988; doi:10.1145/ 1179352.1141988, International Conference on Computer Graphics and Interactive Techniques, Jul. 30-Aug. 3, 2006, pp. 1025-1034.

Gecer et al., "GANFIT: Generative Adversarial Network Fitting for High Fidelity 3D Face Reconstruction", 2019, pp. 1155-1164.

Gotardo et al., "Practical Dynamic Facial Appearance Modeling and Acquisition", ACM Transactions on Graphics, https://doi.org/10. 1145/3272127.3275073, vol. 37, No. 6, Article 232, Nov. 2018, pp. 232:1-232:13.

Graham et al., "Measurement-Based Synthesis of Facial Microgeometry", Eurographics, vol. 32, No. 2, 2013, 10 pages.

Heeger et al., "Pyramid-Based Texture Analysis/Synthesis", Siggraph, Association for Computing Machinery, 1995, pp. 229-238.

Huynh et al., "Mesoscopic Facial Geometry Inference Using Deep Neural Networks", Proceedings of the IEEE Conference on Computer Vision and Pattern Recognition, 2018, pp. 8407-8416.

Haro et al., "Real-time, Photo-realistic, Physically Based Rendering of Fine Scale Human Skin Structure", Rendering Techniques, 2001, pp. 53-62.

Hertzmann et al., "Image Analogies", 28th Annual Conference on Computer Graphics And Interactive Techniques, Aug. 12-17, 2001, pp. 327-340.

Helbing et al., "Modelling the Evolution of Human Trail Systems", Nature, vol. 388, Jul. 3, 1997, pp. 47-50.

Helbing et al., "Self-organizing Pedestrian Movement", Environment and Planning B: Planning and Design, DOI:10.1068/b2697, vol. 28, 2001, pp. 361-383.

Helbing et al., "Computer Simulations of Pedestrian Dynamics and Trail Formation", arXiv:cond-mat/9805074, May 7, 1998, 11 pages.

Ishii et al., "A Generation Model for Human Skin Texture", Communicating with Virtual Worlds, 1993, pp. 139-150.

Kim et al., "Interactive Generation of Realistic Facial Wrinkles from Sketchy Drawings", Computer Graphics Forum, Eurographics, vol. 34, No. 2, 2015, 13 pages.

Limbert et al., "On Skin Microrelief and The Emergence Of Expression Microwrinkles", DOI: 10.1039/x0xx00000x, Soft Matter, 2017, pp. 1-9.

Lattas et al., "Desktop-based High-Quality Facial Capture for Everyone", https://doi.org/10.1145/3532836.3536258, ACM Siggraph, Aug. 7-11, 2022, 3 pages.

Li et al., "Realistic Wrinkle Generation for 3D Face Modeling Based on Automatically Extracted Curves and Improved Shape Control Functions", Computers & Graphics, doi:10.1016/j.cag.2010. 08.003, 2010, pp. 175-184.

Yi-Bo et al., "The Wrinkle Generation Method for Facial Reconstruction Based on Extraction of Partition Wrinkle Line Features and Fractal Interpolation", Fourth International Conference on Image and Graphics, DOI 10.1109/ICIG.2007.96, 2007, pp. 933-937.

Nagano et al., "Skin Microstructure Deformation with Displacement Map Convolution", ACM Transactions on Graphics, DOI: http://doi.acm.org/10.1145/2766894, vol. 34, No. 4, Article 109, Aug. 2015, Aug. 9-13, 2015, pp. 109:1-109:10.

Nahas et al., "Facial Image Synthesis Using Skin Texture Recording", The Visual Computer, vol. 6, 1990, pp. 337-343.

Nogue et al., "Polarization-imaging Surface Reflectometry using Near-field Display", Eurographics Symposium on Rendering, 2022, 9 pages.

Paterson et al., "BRDF and Geometry Capture from Extended Inhomogeneous Samples Using Flash Photography", The Eurographics Association and Blackwell Publishing, 2005, 9 pages.

Riviere et al., "Single-Shot High-Quality Facial Geometry and Skin Appearance Capture", ACM Transactions on Graphics, https://doi. org/10.1145/3386569.3392464, vol. 39, No. 4, Article 81, Jul. 2020, pp. 81:1-81:12.

Riviere et al., "Polarization imaging Reflectometry in the Wild", ACM Transactions on Graphics, https://doi.org/10.1145/3130800. 3130894, vol. 36, No. 6, Article 206, Nov. 2017, pp. 206:1-206:14.

Saito et al., "Photorealistic Facial Texture Inference Using Deep Neural Networks", Proceedings of the IEEE Conference on Computer Vision and Pattern Recognition, 2017, pp. 5144-5153.

(56) References Cited

OTHER PUBLICATIONS

Vanderfeesten et al., "Example-based Skin Wrinkle Displacement Maps", 31st SIBGRAPI Conference on Graphics, Patterns and Images, Oct. 2018, 8 pages.

Pahlen etal., Digital Ira and Beyond: Creating Photoreal Real-Time Digital Characters, Siggraph 2014, Aug. 10-14, 2014, 384 pages.

Valdenegro-Toro et al., "Implementing Noise with Hash functions for Graphics Processing Units", arXiv:1903.12270, Mar. 28, 2019, 7 pages.

Wu et al., "Simulation of Static and Dynamic Wrinkles of Skin", Proceedings Computer Animation, 1998, 12 pages.

Wei et al., "Fast Texture Synthesis using Tree-structured Vector Quantization", Proceedings of the 27th annual conference on Computer graphics and interactive techniques, SIGGRAPH 2000, pp. 479-488.

Yamaguchi et al., "High-Fidelity Facial Reflectance and Geometry Inference From an Unconstrained Image", ACM Transactions on Graphics, https://doi.org/10.1145/3130800.3130817, vol. 37, No. 4, Article 162, pp. 162:1-162:14.

Zhang et al., "Realistic and Efficient Wrinkle Simulation Using An Anatomy-based Face Model with Adaptive Refinement", Proceedings of International Computer Graphics, Jun. 22-24, 2005, pp. 3-10.

Weiss et al., "Graph Simulation for Facial Micro Wrinkles", Eurographics Symposium on Geometry Processing, vol. 42, No. 5, pp. 1-9.

GB Combined Search and Examination Report for Application No. 2405159.1 dated Jan. 21, 2025.

Oat, Christopher, "Animated Wrinkle Maps", Advanced Real-Time Rendering in 3D Graphics and Games Course, Siggraph 2007, pp. 33-37.

Reis et al., "Real-time Simulation of Wrinkles", The 16th International Conference in Central Europe On Computer Graphics, Visualization And Computer Vision In Cooperation With Eurographics, 2008, pp. 109-116.

Dutreve et al., "Real-Time Dynamic Wrinkles of Face for Animated Skinned Mesh", Advances In Visual Computing, 2009, 10 pages.

Kurokawa et al., "Micro-geometric Modeling of Human Face Skis for Cosmetic Analysis", Siggraph, Dec. 12-15, 2011, 1 pages.

GB Combined Search and Examination Report for Application No. 2405158.3 dated Dec. 18, 2024.

Weiss et al., "Graph-Based Synthesis for Skin Micro Wrinkles", Eurographics Symposium on Geometry Processing, vol. 42, No. 5, 2023, 12 pages.

Office Action received for Canadian Application No. 3234932 dated Oct. 27, 2025, 18 pages.

Non-Final Office Action received for U.S. Appl. No. 18/628,602 dated Dec. 11, 2025, 41 pages.

First Examination Report received for New Zealand Application No. 809983 dated Dec. 11, 2025, 4 pages.

Final Office Action received for U.S. Appl. No. 18/628,602 dated May 4, 2026, 35 pages.

* cited by examiner

300

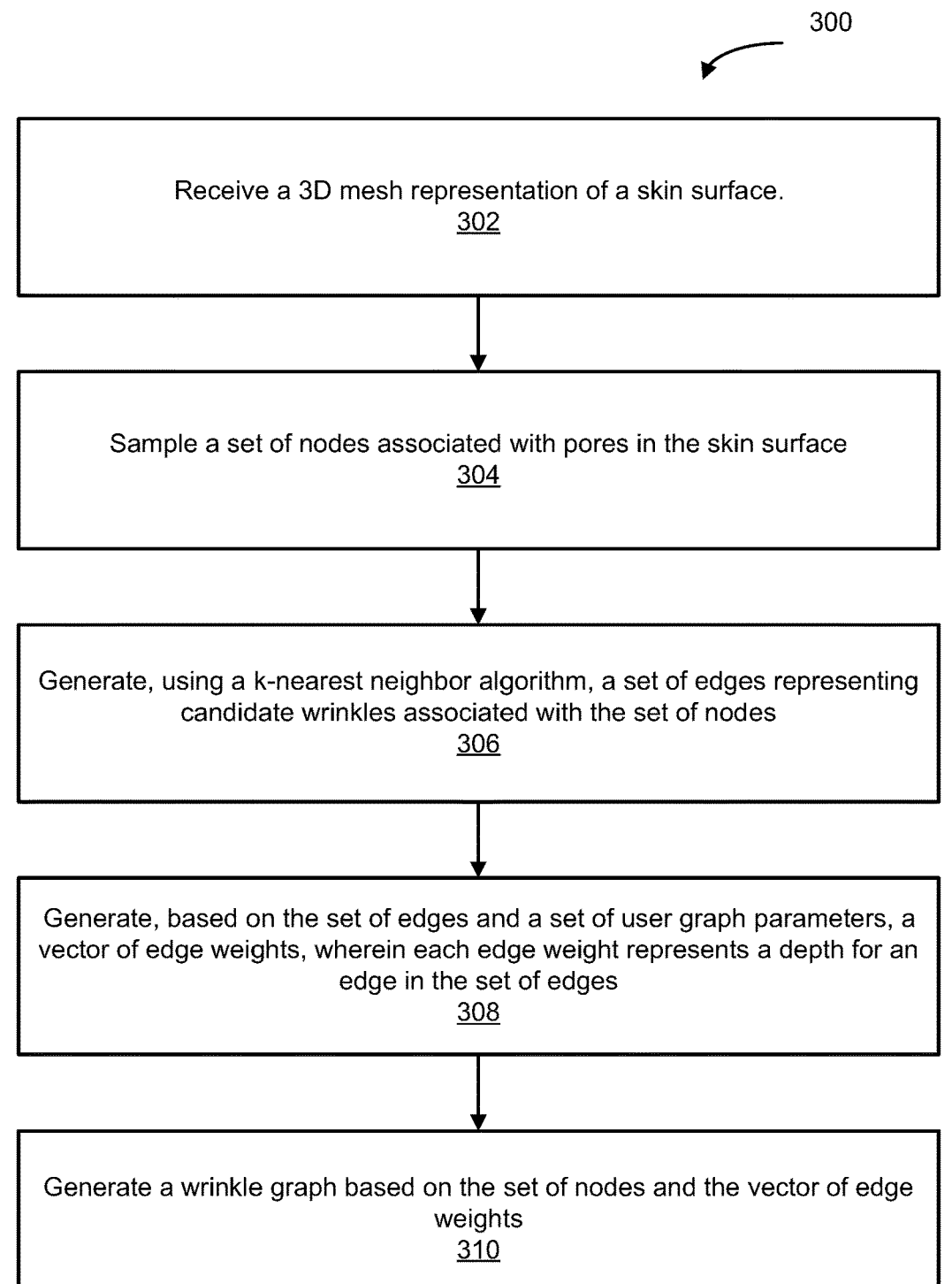

Receive a 3D mesh representation of a skin surface.
302

Sample a set of nodes associated with pores in the skin surface
304

Generate, using a k-nearest neighbor algorithm, a set of edges representing candidate wrinkles associated with the set of nodes
306

Generate, based on the set of edges and a set of user graph parameters, a vector of edge weights, wherein each edge weight represents a depth for an edge in the set of edges
308

Generate a wrinkle graph based on the set of nodes and the vector of edge weights
310

FIG. 3

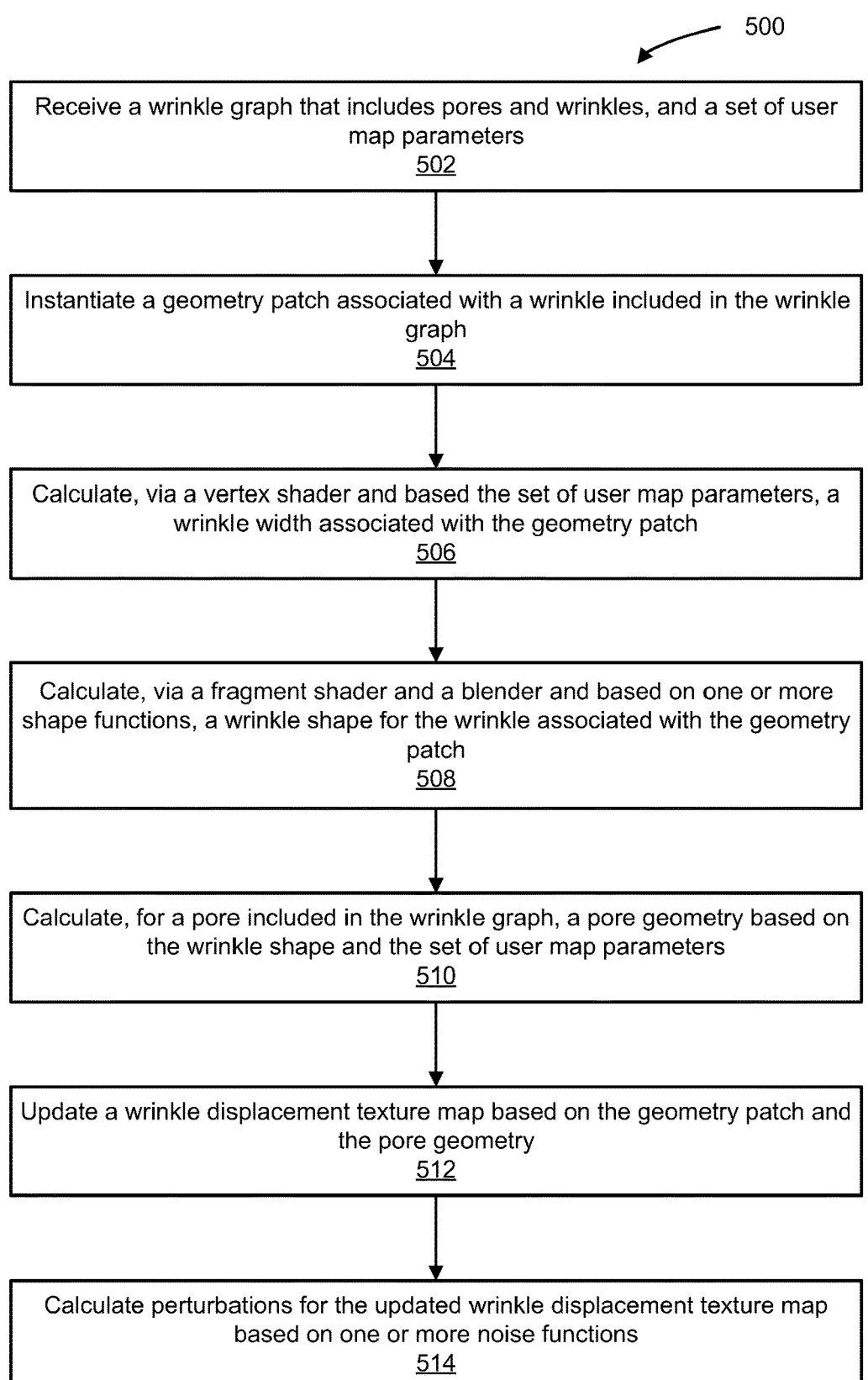

500

Receive a wrinkle graph that includes pores and wrinkles, and a set of user map parameters
502

Instantiate a geometry patch associated with a wrinkle included in the wrinkle graph
504

Calculate, via a vertex shader and based the set of user map parameters, a wrinkle width associated with the geometry patch
506

Calculate, via a fragment shader and a blender and based on one or more shape functions, a wrinkle shape for the wrinkle associated with the geometry patch
508

Calculate, for a pore included in the wrinkle graph, a pore geometry based on the wrinkle shape and the set of user map parameters
510

Update a wrinkle displacement texture map based on the geometry patch and the pore geometry
512

Calculate perturbations for the updated wrinkle displacement texture map based on one or more noise functions
514

FIG. 5

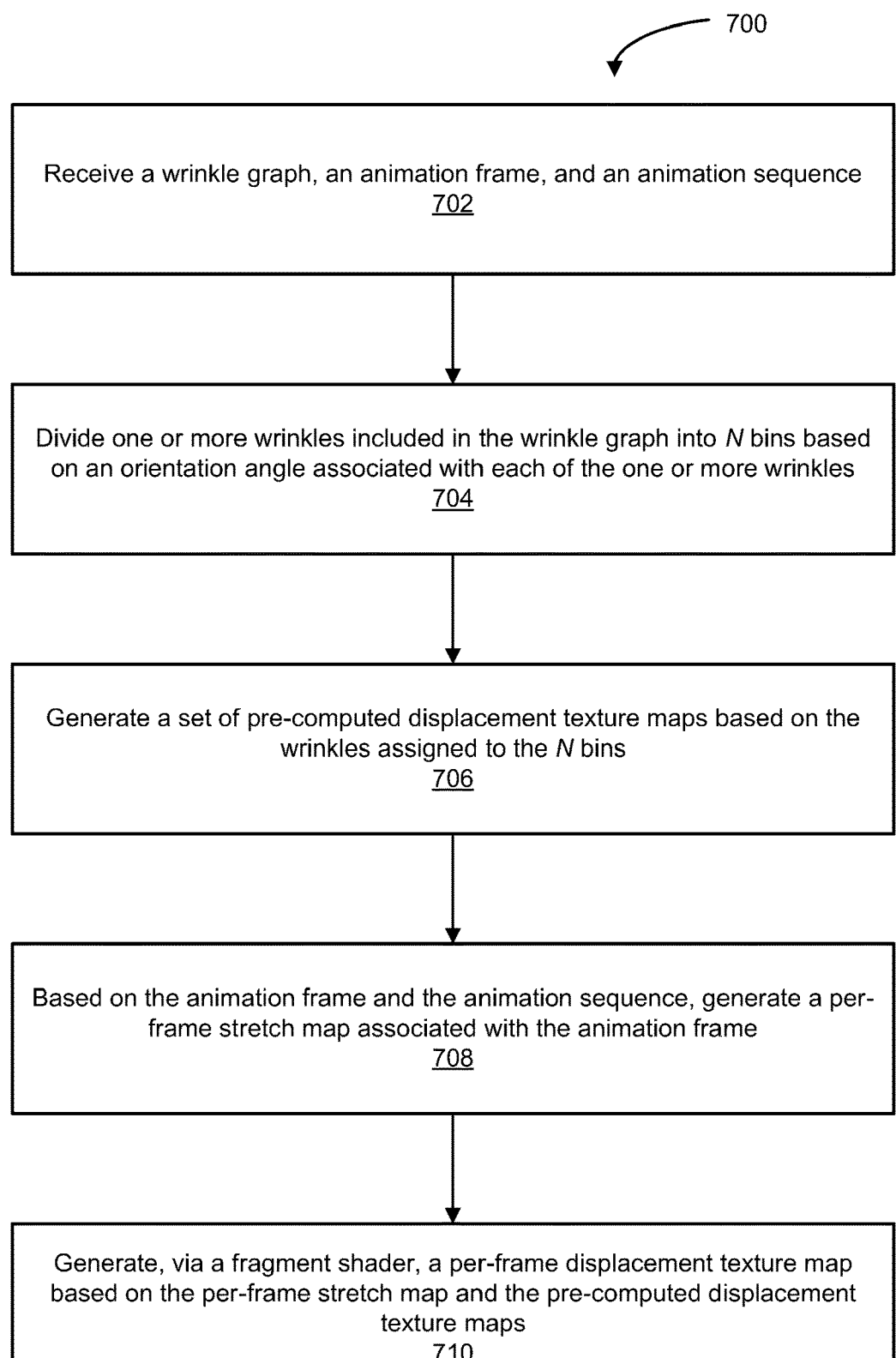

700

Receive a wrinkle graph, an animation frame, and an animation sequence
702

Divide one or more wrinkles included in the wrinkle graph into *N* bins based on an orientation angle associated with each of the one or more wrinkles
704

Generate a set of pre-computed displacement texture maps based on the wrinkles assigned to the *N* bins
706

Based on the animation frame and the animation sequence, generate a per-frame stretch map associated with the animation frame
708

Generate, via a fragment shader, a per-frame displacement texture map based on the per-frame stretch map and the pre-computed displacement texture maps
710

FIG. 7

GRAPH SIMULATION FOR FACIAL MICRO FEATURES VIA PRE-COMPUTED DISPLACEMENT TEXTURE MAPS

CROSS-REFERENCE TO RELATED APPLICATIONS

This application claims priority benefit to the U.S. provisional application titled "GRAPH SIMULATION FOR FACIAL FEATURES," filed on Apr. 11, 2023 and having Ser. No. 63/495,535 and to the U.S. provisional application titled "FAST DYNAMIC FACIAL WRINKLES," filed on Jan. 2, 2024 and having Ser. No. 63/617,046. These related applications are also hereby incorporated by reference in their entirety.

BACKGROUND

Field of the Various Embodiments

Embodiments of the present disclosure relate generally to machine learning and computer vision and, more specifically, to techniques for modeling facial wrinkles under dynamic facial expression.

DESCRIPTION OF THE RELATED ART

The accurate representation of facial micro features, including wrinkles and other skin texture, is an important step in creating, rendering, and animating digital avatars and other three-dimensional (3D) character representations. A digital avatar may be a static representation of a character as a still image or a dynamic representation of a user in, e.g., a chat, telepresence, or entertainment application. Accurately modeling facial micro features provides a digital avatar with a more natural and organic appearance, rather than an overly smooth or plastic appearance.

Existing techniques for representing facial micro features may uniformly apply one or more generated noise patterns to an avatar's skin. The applied noise pattern modifies the uniform representation of skin texture to simulate micro features in the skin. These techniques are generally computationally simple and may be suitable for real-time modification of a digital avatar.

One drawback of noise-based texture modification is that the uniformly applied noise patterns do not include sufficient structure to accurately model or simulate micro features such as wrinkles. Wrinkles may include a structural directionality characteristic, such as a horizontal, vertical, or other orientation, and may also have a finite length determined by defined endpoints. Uniform noise patterns may not adequately address these structural characteristics. Further, noise-based texture modifications may not provide sufficient realism and may therefore be inadequate for generating close-up representations of a digital avatar's skin.

Other existing techniques may utilize a static displacement texture map. A static displacement texture map may represent one or more facial micro features as a collection of deformations or perturbations in an otherwise uniform surface. A static displacement texture map, when applied to a representation of a digital avatar, distorts the digital representation to model the one or more facial micro features.

One drawback to static displacement texture maps is that a specific arrangement of facial micro features represented by a static displacement texture map is fixed and only suitable for application to a static representation of, e.g., a digital avatar's face. A static displacement texture map generates unrealistic results when applied to digital avatars that are subject to dynamic facial expression. Dynamic facial expressions produce changing deformations in the skin, such as stretching and compression, that are not modeled in the static displacement texture map. The effects of these changing deformations on facial micro features are anisotropic, meaning that the effects of the deformations depend on the orientation of the affected facial micro features. For example, a horizontal wrinkle that is compressed in the vertical direction may become narrower and deeper, while the same wrinkle may become wider and shallower when stretched vertically. As a result, static displacement texture maps may produce unrealistic results for dynamic facial expressions. As the foregoing illustrates, what is needed in the art are more effective techniques for modeling facial wrinkles under dynamic facial expression.

SUMMARY

In one embodiment, a computer-implemented method for simulating skin wrinkles comprises receiving a wrinkle graph, wherein the wrinkle graph includes a plurality of nodes associated with a plurality of pores included in a three-dimensional (3D) representation of a facial structure and a plurality of edges associated with a plurality of wrinkles included in the 3D representation of the facial structure. The computer-implemented method also includes assigning one or more of the plurality of wrinkles associated with edges included in the wrinkle graph to one of a plurality of bins, generating, for each of the bins, a plurality of pre-computed displacement texture maps, and generating, based on at least one or more of the plurality of edges and the pre-computed displacement texture maps, a per-frame displacement texture map. The computer-implemented method further includes modifying an animation frame based on the per-frame displacement texture map, such that the modified animation frame depicts the plurality of pores and the plurality of wrinkles included in the 3D representation of the facial structure.

One technical advantage of the disclosed techniques relative to the prior art is that the disclosed techniques accurately model facial micro features under static or dynamic facial expression. Unlike existing techniques that simulate micro features using a noise pattern, the disclosed techniques allow for the realistic representation of structured micro features such as wrinkles. The disclosed techniques also allow for fine artistic controllability of the skin appearance based on user-provided parameters. Further, the disclosed techniques account for anisotropic stretch and compression effects of dynamic facial expressions on facial micro features. Specifically, the disclosed techniques modify the appearance of a facial micro feature based on both the orientation of the micro feature and the directionality of an applied stretching or compressing force. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a flow diagram of method steps for performing graph generation, according to some embodiments.

FIG. 5 is a flow diagram of method steps for performing map generation, according to some embodiments.

FIG. 7 is a flow diagram of method steps for performing binning and shading, according to some embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
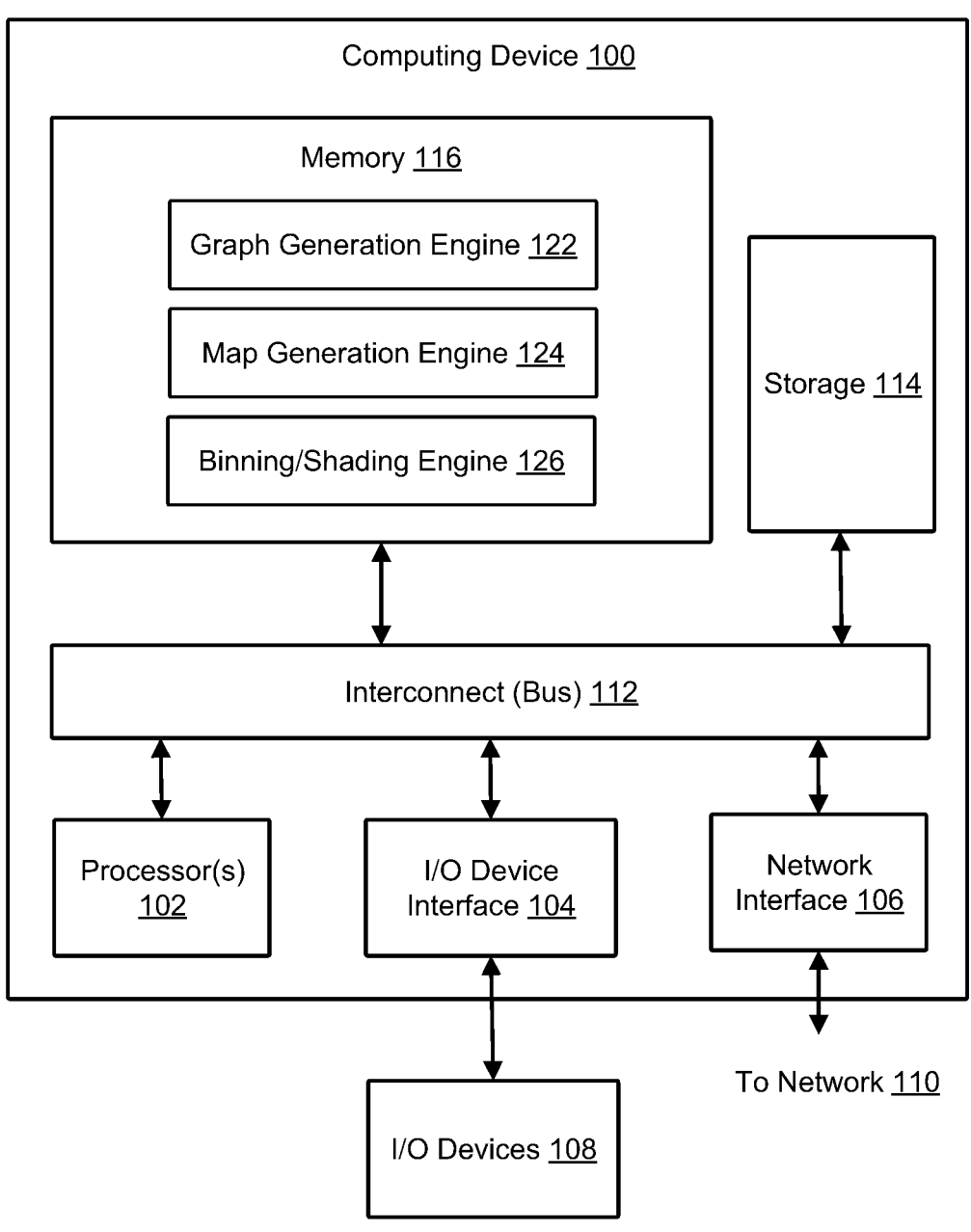
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a graph generation engine 122, a map generation engine 124, and a binning/shading engine 126 that reside in a memory 116. In some embodiments, map generation engine 124 or binning/shading engine 126 may be omitted.

It is noted that the computing device described herein is illustrative and that any other technically feasible configurations fall within the scope of the present disclosure. For example, multiple instances of graph generation engine 122, map generation engine 124, and binning/shading engine 126 could execute on a set of nodes in a distributed and/or cloud computing system to implement the functionality of computing device 100. In another example, graph generation engine 122, map generation engine 124, and/or binning/shading engine 126 could execute on various sets of hardware, types of devices, or environments to adapt graph generation engine 122, map generation engine 124, or binning/shading engine 126 to different use cases or applications. In a third example, graph generation engine 122, map generation engine 124, and binning/shading engine 126 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, a microphone, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Graph generation engine 122, map generation engine 124, and binning/shading engine 126 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including graph generation engine 122, map generation engine 124, and binning/shading engine 126.

Graph Generation for Skin Micro Features

Figure 2:
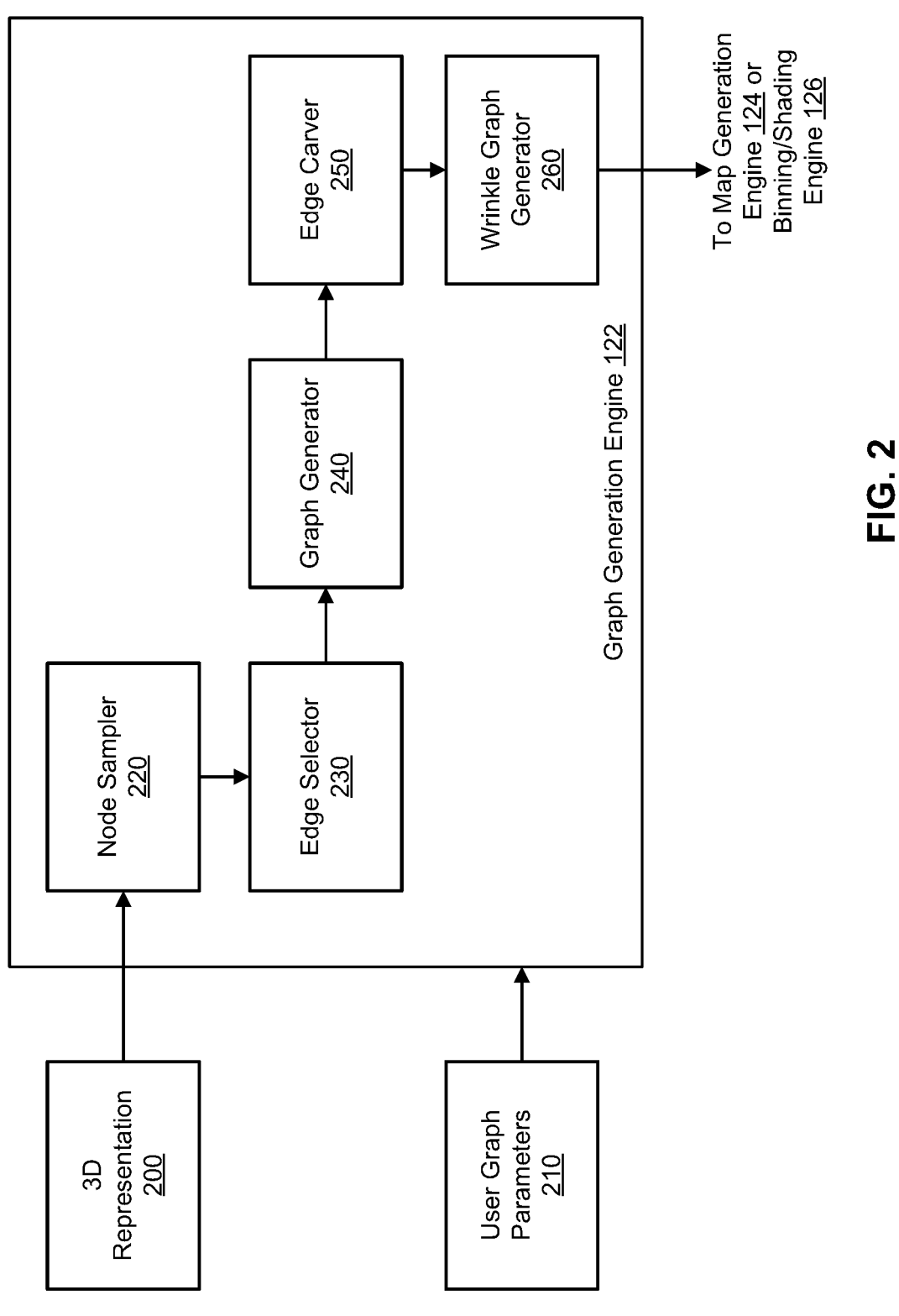
FIG. 2 is a more detailed illustration of graph generation engine 122 of FIG. 1, according to some embodiments.

FIG. 2 is a more detailed illustration of graph generation engine 122 of FIG. 1, according to some embodiments. For a given three-dimensional (3D) representation 200 of a facial structure including a region of skin and user graph parameters 210, graph generation engine 122 generates a wrinkle graph that includes a set of nodes and a set of edges. As shown in FIG. 2, graph generation engine 122 also includes, without limitation, node sampler 220, edge selector 230, graph generator 240, edge carver 250, and wrinkle graph generator 260.

Graph generation engine 122 receives 3D representation 200 from a user or an upstream software application. 3D representation 200 may be associated with a single frame of an animation sequence that includes multiple frames. In various embodiments, 3D representation 200 may include a 3D mesh generated from, e.g., a laser range scanner or a camera-based studio capture device. In other embodiments, 3D representation 200 may include a 3D mesh based on a computer-generated artistic sculpture. The 3D mesh may include multiple connected polygons, such as triangles that describe a 3D structure. 3D representation 200 includes a UV-wrapped skin mesh that includes the two maps V,N: $[0,1]^2 \rightarrow \mathbb{R}^3$ that map a uv coordinate to the world position (V) and normal (N).

User graph parameters 210 include one or more parameters utilized by graph generation engine 122. These parameters include, without limitation, a primary orientation for wrinkles in a region of skin $\alpha_\Theta$, a deposit strength $\alpha_{deposit}$, and one or more reward and/or penalty terms, such as a $\rho_{cross}$ term that penalizes crossing wrinkles or a $\rho_{cont}$ term that rewards longer wrinkles. User graph parameters 210 are discussed in more detail in the paragraphs below.

Node sampler 220 samples a set of nodes from 3D representation 200 in UV space. Each sampled node is associated with a pore in the region of skin included in a facial structure represented by 3D representation 200. Node sampler 220 generates a vector V of nodes V: $=\{v_i \in [0,1]^2,$ i=1, 2, . . . , $N_V\}$. In various embodiments, node sampler 220 may sample the nodes according to a uniform Poisson disk sampling scheme with a user-defined average node distance ad provided in user graph parameters 210. In other embodiments where node sampler 220 samples nodes from an irregular surface, such as an entire face, node sampler 220 may utilize a spatially varying minimal distance in the Poisson disk sampling to generate nodes that are approximately uniformly spaced apart on 3D representation 200 after UV projection.

In various embodiments, node sampler 220 may, at certain points in time, such as repeatedly or periodically, sample nodes at varying scales. For example, node sampler 220 may first sample a set of nodes at a coarse resolution and initialize a finer resolution sampling using the coarse sampling of nodes. During the finer resolution sampling, node sampler 220 samples additional nodes in-between the nodes previously sampled during the coarse sampling. Node sampler 220 transmits the vector V of sampled nodes to edge selector 230.

Edge selector 230 defines edges that connect node pairs in the vector V of nodes via a k-nearest neighbor algorithm. For each node $v_i$ in vector V, edge selector 230 calculates the k nearest neighboring nodes $v_j$ to node $v_i$. For each of the k nearest neighboring nodes, edge selector 230 adds the edge $\{v_i, v_j\}$ to a list of edges E. Edge selector 230 transmits the node vector V and the list of edges E to graph generator 240.

Graph generator 240 generates a graph G=(V,E) based on vector V and the list of edges E. The resulting graph includes a set of nodes V representing pores and a set of edges E that begin and terminate at nodes included in V. Graph generator 240 transmits the graph G=(V,E) to edge carver 250.

Edge carver 250 receives the graph G=(V,E) from graph generator 240. The list of edges E in graph G represent candidate wrinkles, with each candidate wrinkle beginning at a pore represented by a node in graph G and ending at a different pore represented by a different node in graph G. Edge carver 250 iteratively computes a vector of edge weights $W \in \mathbb{R}^{|E|}$ associated with the edges E in G. An edge weight computed for a particular edge in G represents a depth associated with the wrinkle represented by the edge.

Due to anisotropic stress on a region of skin caused by muscle deformations in predominant directions, the micro feature on the region of skin included in a facial structure often shows a significant directional component. For example, forehead wrinkles may predominantly include a horizontal or east-west directional component, or flow line. In various embodiments, the predominant directional component or flow line for a region of skin may be expressed as a primary angle $\alpha_\Theta$. In various embodiments, multiple values for primary angle $\alpha_\Theta$ may be provided as one of user graph parameters 210, with each of the multiple values corresponding to a different region of skin. Edge carver 250 simulates these flow lines by probabilistically selecting an outgoing edge from a node based on an angle $\Theta$ associated with the edge. For a randomly selected node $v_i$ in graph G, edge carver 250 selects an outgoing edge with a probability of $\mathbb{P}[\Theta; v_i]$:

$$\mathbb{P}[\Theta] \propto \alpha_s + \exp\left(-\frac{|\Theta - a_\Theta|_\pi^2 \frac{2}{\pi}}{\sigma^2}\right) \quad (1)$$

where $$|\Theta_1 - \Theta_2|_\pi := \min\{\Theta_1 - \Theta_2, \Theta_1 - \Theta_2 - \pi, \Theta_1 - \Theta_2 + \pi) \quad (2)$$

and $\sigma$ is a predefined variance and $\alpha_s$ is a predefined base strength. Equation (1) produces a higher probability of selection for an edge with an angle $\Theta$ that is closer to a primary orientation. angle $\alpha_\Theta$.

Edge carver 250 may include various user-specified penalty and reward terms included in user graph parameters 210 to modify the probability generated by Equation (1). In various embodiments, edge carver 250 may include a penalty term $\rho_{cross}$ that reduces the selection probability calculated for edges that cross other edges. Edge carver 250 may also include a reward term $\rho_{cont}$ that increases the selection probability for an edge leaving a node that continues in a similar direction as a different edge entering the node, encouraging longer wrinkles that span multiple nodes. Edge carver 250 incrementally increases a weight $W_i$ of the selected incident edge i during a global time step $\Delta t$ based on user graph parameter $\alpha_{deposit}$ (deposit strength), subject to a maximal wrinkle depth of 1:

$$W_i \leftarrow W_i + \Delta t\, \alpha_{deposit}(1 - W_i) \quad (3)$$

Edge carver 250 continues selecting random nodes and carving out selected wrinkles represented by edges incident to those nodes during a predetermined number of iterations. In various embodiments, edge carver 250 may select N=50, 000 edges at once, repeated for multiple iterations M, e.g. M=1000. Edge carver 250 transmits graph G and weight vector W to wrinkle graph generator 260.

Wrinkle graph generator 260 associates the edge weights W with the edges E in graph G and generates a wrinkle graph that includes a set of nodes and a set of weighted edges incident to those nodes. Each node in the wrinkle graph represents a pore, and each edge in the wrinkle graph represents a wrinkle with an associated wrinkle depth. Wrinkle graph generator 260 transmits the generated wrinkle graph to map generation engine 124 discussed below in reference to FIG. 4 or binning/shading engine 126 discussed below in reference to FIG. 6.

FIG. 3 is a flow diagram of method steps for performing graph generation, according to some embodiments. Although the method steps are described in conjunction with the systems of FIGS. 1 and 2, persons skilled in the art will understand that any system configured to perform the method steps in any order falls within the scope of the present disclosure.

As shown, in operation 302 of method 300, graph generation engine 122 receives a 3D mesh representation of a skin surface. The 3D mesh may include multiple connected polygons, such as triangles, that describe a 3D structure. 3D representation 200 includes a UV-wrapped skin mesh that includes the two maps V,N: $[0,1]^2 \rightarrow \mathbb{R}^3$ that map a uv coordinate to the world position (V) and normal (N).

In operation 304, graph generation engine 122 samples a set of nodes V from 3D representation 200 in UV space. Each sampled node is associated with a pore in the region of skin included in a facial structure represented by 3D representation 200. Graph generation engine 122 may iteratively sample nodes from 3D representation 200 at various levels of granularity, initializing a finer-grained sampling with the nodes selected during a coarser-grained sampling and adding additional nodes to the finer-grained sampling.

In operation 306, graph generation engine 122 generates a set of edges E representing candidate wrinkles. Using a k-nearest neighbor algorithm, graph generation engine 122 defines edges between each node in the set of nodes and the k nearest neighbors of the node. Graph generation engine 122 defines a graph G=(V,E) based on the sampled set of nodes V and the generated set of edges E.

In operation 308, graph generation engine 122 iteratively generates a vector W of edge weights, where each edge weight in W is associated with an edge in the set of edges E and represents a depth for the candidate wrinkle associated with the edge in the set of edges E.

In operation 310, graph generation engine 122 associates the edge weights included in vector W with the edges E in graph G and generates a wrinkle graph that includes a set of nodes and a set of weighted edges incident to those nodes. Graph generation engine 122 may then transmit the wrinkle graph to map generation engine 124 or binning/shading engine 126.

Displacement Texture Map Generation for Skin Micro Features

Figure 4:
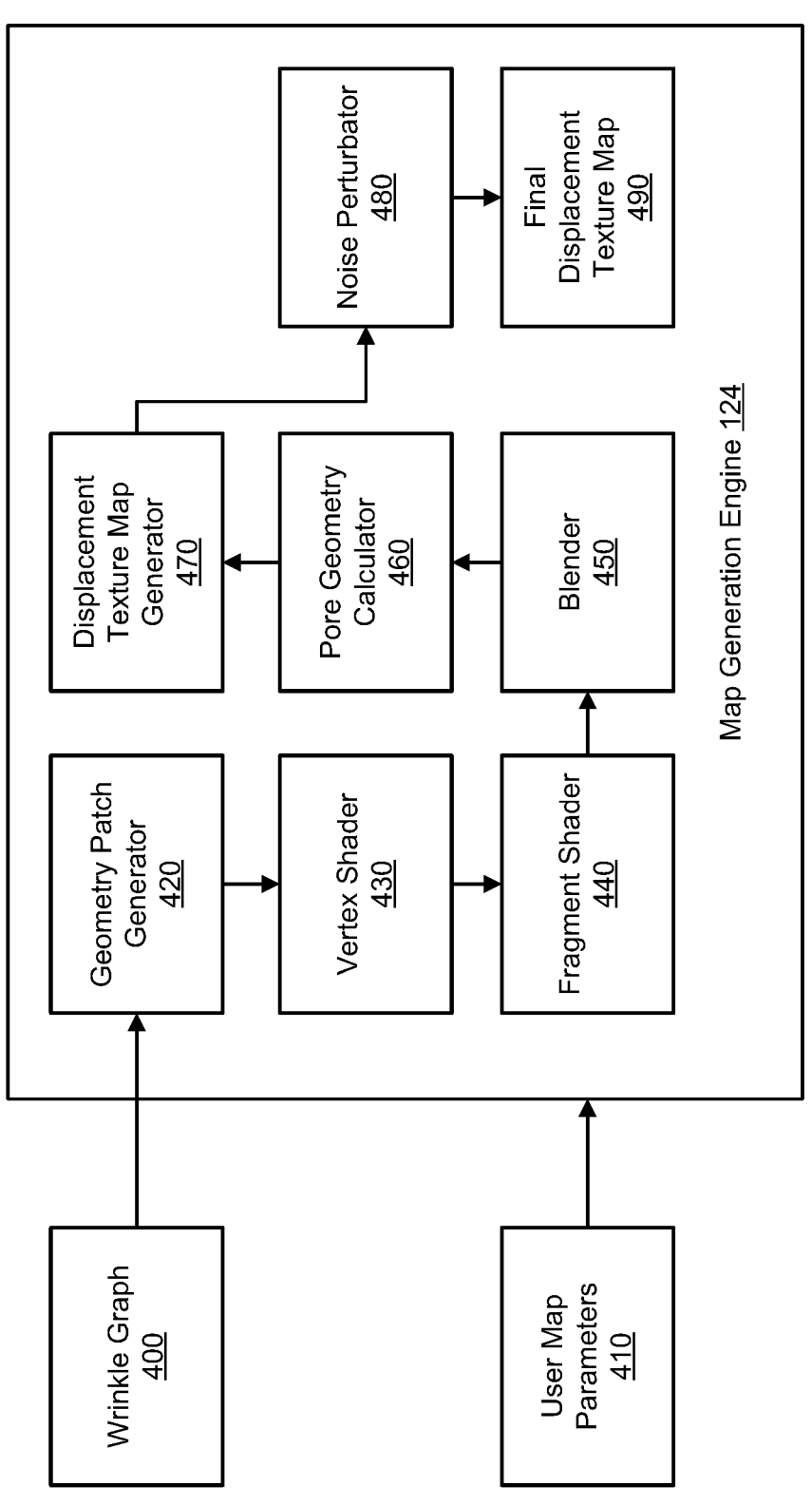
FIG. 4 is a more detailed illustration of map generation engine 124 of FIG. 1, according to some embodiments.

FIG. 4 is a more detailed illustration of map generation engine 124 of FIG. 1, according to some embodiments. Map generation engine 124 receives a wrinkle graph 400 from graph generation engine 122 as described above in reference to FIGS. 2 and 3. Based on wrinkle graph 400 and user map parameters 410, map generation engine 124 converts the wrinkle graph 400 into a final displacement texture map 490 in UV displacement space. As shown, map generation engine 124 includes, without limitation, geometry patch generator 420, vertex shader 430, fragment shader 440, blender 450, pore geometry calculator 460, displacement texture map generator 470, and noise perturbator 480.

As described above in reference to FIGS. 2 and 3, wrinkle graph 400 includes a set of nodes and a set of weighted edges. The nodes in wrinkle graph 400 represent pores in a region of skin included in a facial structure and the edges in wrinkle graph 400 represent wrinkles in the region of skin that begin and end at nodes included in the wrinkle graph 400. The weight associated with each edge in wrinkle graph 400 determines the depth of the wrinkle represented by the edge.

User map parameters 410 include one or more user-specified parameters utilized by map generation engine 124. These parameters include, without limitation, wrinkle width $\alpha_{wrinkle-width}$, pore width $\alpha_{pore-width}$, minimum pore strength $\alpha_{dmin}$, pore skew strength $\alpha_{skew}$, cushioning effect $\alpha_{cushion}$, wrinkle perturbation frequency $\alpha_{fperturb}$, wrinkle perturbation strength $\alpha_{sperturb}$, additive noise frequency $\alpha_{fnoise}$, and additive noise strength $\alpha_{snoise}$. User map parameters 410 are discussed in more detail in the paragraphs below.

Geometry patch generator 420 generates a geometry patch for each weighted edge included in wrinkle graph 400. A geometry patch includes an edge in wrinkle graph 400 drawn as a line, with a width determined by the user map parameter $\alpha_{wrinkle-width}$ and an edge weight included in wrinkle graph 400. Geometry patch generator 420 transmits the geometry patch to vertex shader 430.

Vertex shader 430 receives a geometry patch from geometry patch generator 420 and adjusts the line endpoints included in the geometry patch, such that the line starts and ends at the incident nodes of the current wrinkle and has a width proportional to the strength of the wrinkle scaled by the user map parameter $\alpha_{wrinkle-width}$. The adjusted geometry patch represents a modified fragment of wrinkle graph 400, and vertex shader 430 transmits the fragment to fragment shader 440.

Fragment shader 440 modifies the displacements in a fragment received from vertex shader 430 based on a shape function. The shape function calculates modifications to the displacements in a fragment representing a wrinkle, based on a wrinkle width w, a wrinkle depth d, and a distance x from a centerline of the wrinkle. In various embodiments, fragment shader 440 includes a shape function given by:

$$S_{bulge}(x) := (x-3)^2(x-1)/9, \tag{4}$$

$$x \in [0, 3]$$

In Equation (4), the interval $x \in [0,1]$ represents the deepest portion of the wrinkle nearest the wrinkle centerline, and the interval $x \in [1,3]$ represents a bulge in the wrinkle further away from the wrinkle centerline.

The above shape function modifies the displacement in a fragment that represents a wrinkle such that the wrinkle is deepest along its centerline and gradually becomes shallower or bulges further away from the centerline. Fragment shader 440 iteratively accumulates displacements for multiple fragments into a displacement texture map (not shown) associated with wrinkle graph 400.

Blender 450 blends displacements associated with multiple fragments that are located in the same texel (texture element) of the displacement texture map. A texel is the smallest element of a displacement texture map and may be a single polygon e.g., a triangle. When a single texel includes multiple fragments, with each fragment representing a different wrinkle, the multiple displacements may be smoothly blended together with a probabilistic activation function such as softmax or MelloMax. Blender 450 stores the blended displacements in the displacement texture map associated with wrinkle graph 400. These blended displacements are combined with the accumulated displacements previously generated by fragment shader 440.

As discussed above, vertex shader 430, fragment shader 440, and blender 450 modify the displacements associated with wrinkles (weighted edges) included in wrinkle graph 400. Pore geometry calculator 460 modifies the displacements associated with pores (nodes) included in wrinkle graph 400. Pore geometry calculator 460 modifies the displacements associated with a pore based on the weighted edges in wrinkle graph 400 associated with wrinkles that begin or end at the pore. In various embodiments, pore geometry calculator 460 may calculate a pore strength $w_v$ based on the weighted edges in wrinkle graph 400 associated with one or more wrinkles incident on the pore and adjust a depth and a width of the pore based on the user map parameter $\alpha_{dmin}$ (minimum pore strength). Pore geometry calculator 460 further stretches the pore in the direction of the primary orientation $\alpha_\ominus$ based on the user map parameter $\alpha_{skew}$ (pore skew strength).

In various embodiments, pore geometry calculator 460 applies a cushioning effect where a user-supplied fraction $\alpha_{cushion}$ of the pore strength $w_v$ is applied to the wrinkles incident on the pore, breaking up the regularity of the calculated pore and wrinkle displacements. In various embodiments, pore geometry calculator 460 calculates a pore strength $w_v$ for a pore based on a combination of edge weights included in vector W associated with one or more wrinkles in wrinkle graph 400 incident on the pore. Pore geometry 460 then increases each edge weight incident on the pore by an amount equal to pore strength $w_v$ multiplied by $\alpha_{cushion}$.

Displacement texture map generator 470 generates an updated displacement texture map associated with wrinkle graph 400 based on the cumulative displacements generated by fragment shader 440, blender 450, and pore geometry calculator 460. In some embodiments, noise perturbator 480 may introduce small random adjustments to reduce the uniformity in the displacement texture map and increase realism. Noise perturbator 480 may displace each wrinkle vertex $x_i$ of the displacement texture map by a small offset. Noise perturbator 480 calculates this offset via a multi-scale Perlin Noise function applied at a point along the centerline of the wrinkle closest to $x_i$. Noise perturbator 480 may adjust these offsets based on the user map parameters $\alpha_{fperturb}$ (wrinkle perturbation frequency) and $\alpha_{sperturb}$ (wrinkle perturbation strength). Noise perturbator 480 may further add a small amount of Perlin noise to the entire displacement texture map based on the user map parameters $\alpha_{fnoise}$ (additive noise frequency) and $\alpha_{snoise}$ (additive noise strength).

Map generation engine 124 generates final displacement texture map 490 based on the displacement texture map generated by displacement texture map generator 470 and any noise added by noise perturbator 480. Map generation engine 124 may apply final displacement texture map 490 to 3D representation 200 via a renderer (not shown) to incorporate the wrinkles and pores represented by final displacement texture map 490 into 3D representation 200.

FIG. 5 is a flow diagram of method steps for performing map generation, according to some embodiments. Although the method steps are described in conjunction with the systems of FIGS. 1-4, persons skilled in the art will understand that any system configured to perform the method steps in any order falls within the scope of the present disclosure.

As shown, in operation 502 of method 500, map generation engine 124 receives wrinkle graph 400 that includes nodes representing pores and weighted edges representing wrinkles. Map generation engine 124 further receives a set of one or more user map parameters 410 that adjust the operation of various components included in map generation engine 124.

In operation 504, map generation engine 124 instantiates a geometry patch associated with a wrinkle included in wrinkle graph 400. A geometry patch includes an edge in wrinkle graph 400 drawn as a line, with a width determined by the user map parameter $\alpha_{wrinkle-width}$ and an edge weight included in wrinkle graph 400.

In operation 506, map generation engine 124 determines a width associated with a wrinkle included in the geometry patch. Vertex shader 430 adjusts the line endpoints included in the geometry patch such that the line starts and ends at the incident nodes of the current wrinkle and has a width proportional to the strength of the wrinkle scaled by the user map parameter $\alpha_{wrinkle-width}$. Vertex shader 430 saves the adjustments to the wrinkle in a displacement texture map.

In operation 508, map generation engine 124 calculates a wrinkle shape for the wrinkle associated with the geometry patch. Based on one or more shape functions, fragment shader 440 adjusts the shape of the wrinkle such that the depth of the wrinkle is greatest along the centerline of the wrinkle and decreases further away from the centerline of the wrinkle. Via blender 450, map generation engine 124 blends and smooths multiple wrinkles that appear in the same texel (texture element) of the displacement texture map and updates the displacement texture map.

In operation 510, map generation engine 124 calculates a pore geometry for a pore included in wrinkle graph 400. Map generation engine 124 may adjust the depth of the pore based on one or more of user map parameters 410 and the depth of wrinkles that begin or end at the pore. Map generation engine 124 may further stretch or skew the pore in the direction of a primary orientation do.

In operation 512, map generation engine generates an updated displacement texture map based on the adjustment applied to the geometry patch and the adjustments to the pore included in wrinkle graph 400.

In operation 514, map generation engine 124 calculates one or more noise perturbations for the updated displacement texture map to decrease the uniformity of the updated displacement texture map. Map generation engine 124 may displace each wrinkle vertex $x_i$ of the updated displacement texture map by a small offset based on a multi-scale Perlin noise function. Map generation engine 124 may further apply a small amount of Perlin noise to the entire updated displacement texture map. The one or more noise perturbations may disrupt the regularity of features included in the updated displacement texture map, improving the realism of the updated displacement texture map. Map generation engine 124 generates final displacement texture map 490 based on the updated displacement texture map and any added noise perturbations.

Binning and Rendering of Skin Micro Features

The displacement texture map generation techniques discussed above in reference to FIGS. 4 and 5 are suitable for simulating skin micro wrinkles in each frame of a multi-frame animation sequence. However, the above techniques require separate calculation of the wrinkle geometry for each wrinkle included in wrinkle graph 400, and these calculations may require significant computing time and resources.

Figure 6:
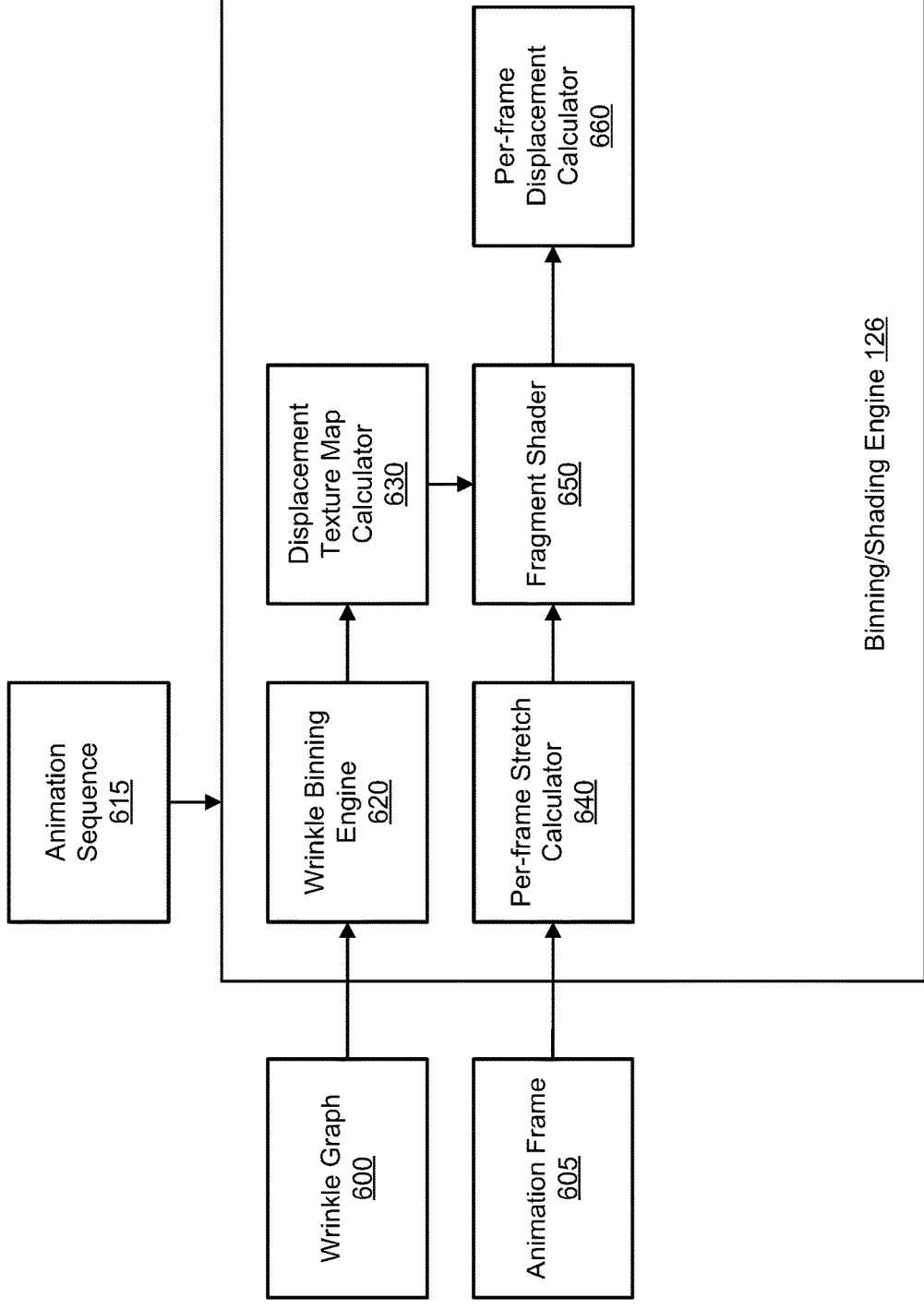
FIG. 6 is a more detailed illustration of binning/shading engine 126 of FIG. 1, according to some embodiments.

The techniques described below in reference to FIGS. 6 and 7 represent an alternative embodiment that may generate a displacement texture map for a frame of an animation sequence in a shorter time and require fewer computing resources. The techniques described below include splitting the wrinkles included in a wrinkle graph into multiple bins based on the orientations of the wrinkles. The techniques further generate multiple pre-computed displacement texture maps for each of the multiple bins. By applying these pre-computed displacement texture maps to the associated binned wrinkles and processing the displaced wrinkles in a fragment shader based on a per-frame stretch map, the techniques may quickly produce a realistic displacement texture map for an animation frame.

FIG. 6 is a more detailed illustration of binning/shading engine 126 of FIG. 1, according to some embodiments. Binning/shading engine 126 splits wrinkles included in a wrinkle graph 600 into multiple bins based on the orientations of the wrinkles. Similar to wrinkle graph 400, in some implementations, wrinkle graph 600 may be generated by wrinkle graph generator 260 (FIG. 2) and/or according to method 300 (FIG. 3). Binning/shading engine 126 further generates multiple pre-computed displacement texture maps for each of the bins. Based on the pre-computed displacement texture maps and a per-frame stretch map generated from an animation frame 605, binning/shading engine 126 generates a per-frame displacement texture map associated with the animation frame. As shown, binning/shading engine 126 also includes, without limitation, wrinkle binning engine 620, displacement texture map calculator 630, per-frame stretch calculator 640, fragment shader 650, and per-frame displacement calculator 660.

Wrinkle graph 600 includes a graph G=(V,E) where V={$v_1$, $v_2$, $v_3$ . . . $v_N$} are the nodes or pores in a region of skin represented by graph G and E={$e_1$, $e_2$, $e_3$, . . . $e_M$} are the edges or wrinkles in the region of skin represented by graph G. Each edge in E includes an associated orientation $\Theta_e$.

Animation frame 605 includes a 3D mesh representation associated with a single frame of a multi-frame animation sequence. In some embodiments, the 3D mesh may include multiple polygons e.g., triangles. Each polygon P'included in animation frame 605 may represent a stretched or otherwise deformed representation of a corresponding polygon P in a neutral or undeformed 3D mesh associated with the animation sequence.

Animation sequence 615 includes multiple 3D mesh representations associated with multiple frames of a multi-frame animation sequence. In some embodiments, animation sequence 615 may include animation frame 605. In some embodiments, each of the 3D mesh representations may include multiple polygons e.g., triangles. Binning/shading engine 126 analyzes the multiple 3D mesh representations to compute tension and stretch vectors based on relative deformations in corresponding polygons of the multiple different 3D mesh representations included in animation sequence 615.

Wrinkle binning engine 620 splits the wrinkles included in wrinkle graph 600 into N bins based on the orientation $\Theta_e$ associated with each edge. In some embodiments, N=4 and the four bins represent north-south, east-west, northeast-southwest, and southeast-northwest wrinkle orientations in UV-space.

Displacement texture map calculator 630 pre-computes multiple displacement texture maps for each of the N bins. Displacement texture map calculator 630 analyzes animation sequence 615 and selects a frame that exhibits the greatest deformation compared to other frames in animation sequence 615. Displacement texture map calculator 630 computes stretch tensors across all of the polygons in the selected frame and assigns a maximal stretch value $r_{max}$ equal to a predetermined percentile e.g., the 90th percentile, of the computed stretch tensors. Displacement texture map calculator 630 generates three displacement texture maps for each bin-one displacement texture map associated with maximal stretch ($r=r_{max}$), one displacement texture map associated with maximal compression ($r=-r_{max}$), and one neutral displacement texture map associated with no compression or stretch ($r=0$).

Per-frame stretch calculator 640 generates a per-polygon stretch map associated with animation frame 605. For each polygon included in animation frame 605, per-frame stretch calculator 640 calculates a stretch tensor based on the shape of the polygon and the shape of a corresponding polygon included in a neutral animation frame. In various embodiments, animation sequence 615 may include the neutral animation frame.

Fragment shader 650 receives the per-frame stretch map from per-frame stretch calculator 640 and the pre-computed displacement texture maps from displacement texture map calculator 630. For each position in UV space [0, 1]$^2$, fragment shader 650 calculates a displacement based on the per-frame stretch map and the pre-computed displacement texture maps. For example, a bin includes a wrinkle with a north-south orientation. Based on the UV location of the wrinkle and compression/stretch tensors for the polygons included in the per-frame stretch map, fragment shader 650 determines that various portions of the wrinkle are subjected to different levels of compression. Fragment shader 650 interpolates a displacement based on the pre-computed displacement texture map corresponding to compression/stretch in a north-south oriented wrinkle and the values of the compression/stretch tensor included in the per-frame stretch map corresponding to polygons associated with the wrinkle. Fragment shader 650 continues to process positions in UV space and accumulates displacements for each polygon in animation frame 605. After fragment shader 650 has processed the UV space, fragment shader 650 transmits the accumulated per-polygon displacements to per-frame displacement calculator 660.

Per-frame displacement calculator 660 generates a displacement texture map in UV space corresponding to animation frame 605. For each position in UV space [0, 1]$^2$ included in animation frame 605, per-frame displacement calculator 660 generates a final displacement based on the accumulated displacements generated by fragment shader 650. In various embodiments, per-frame displacement calculator 660 may smooth or blend the accumulated displacements when generating the final displacement for each position in UV space. For example, per-frame displacement calculator 660 may calculate a final displacement that is equal to a minimum of multiple displacements generated by fragment shader 650 across the N bins. Per-frame displacement calculator 660 generates a displacement texture map corresponding to animation frame 605 based on the final displacement values generated for all positions in UV space included in animation frame 605. To display the per-frame mesh with the applied wrinkles on, e.g., a display device, the displacement texture maps are transferred to the polygons. In various embodiments, this is realized by translating the polygon vertices along their normal vectors scaled by the value of the displacement texture map at the UV location of the vertex.

FIG. 7 is a flow diagram of method steps for performing binning and shading, according to some embodiments. Although the method steps are described in conjunction with the systems of FIGS. 1-6, persons skilled in the art will understand that any system configured to perform the method steps in any order falls within the scope of the present disclosure.

As shown, in operation 702 of method 700, binning/shading engine 126 receives a wrinkle graph 600, an animation frame 605, and an animation sequence 615. Wrinkle graph 600 includes a graph G=(V, E), where Vis a set of graph nodes representing pores in a region of skin included in a facial structure and E is a set of graph edges representing wrinkles in the region of skin that begin and end at the graph nodes.

In operation 704, binning/shading engine 126 divides one or more of the wrinkles included in graph G into N bins based on an orientation angle associated with each of the one or more wrinkles. For example, N may be equal to four, and each of the four bins may include wrinkles with one of north-south, east-west, northeast-southwest, or southeast-northwest wrinkle orientations, respectively.

In operation 706, binning/shading engine 126 generates a set of pre-computed displacement texture maps for each of the N bins. For each bin, binning/shading engine 126 generates a displacement texture map representing maximal compression, a displacement texture map representing maximal stretching, and a displacement texture map representing a neutral tension (no stretching or compression). Binning/shading engine 126 calculates the values of maximal compression and stretching based on an analysis of multiple frames of an animation sequence 615.

In operation 708, binning/shading engine 126 generates a per-frame stretch map associated with animation frame 605. For each polygon included in animation frame 605, binning/shading engine 126 generates a stretch tensor associated with the polygon based on a shape of the polygon compared to a corresponding neutral or unstretched polygon included in a frame of animation sequence 615. Binning/shading engine 126 generates the per-frame stretch map based on the stretch tensors associated with the polygons included in animation frame 605.

In operation 710, binning/shading engine 126 generates a per-frame displacement texture map via a fragment shader 650 based on the per-frame stretch map and the pre-computed displacement texture maps for each of the N bins. For each location in UV space, fragment shader 650 interpolates a displacement based on the stretch tensor associated with a polygon in the per-frame stretch map associated with the wrinkle and the pre-computed displacement texture map associated with the bin corresponding to the wrinkle's orientation angle. Binning/shading engine 126 accumulates the interpolated displacements into the per-frame displacement texture map.

In sum, the disclosed techniques generate a displacement texture map that simulates skin micro wrinkles in a 3D mesh representation of a region of skin included in e.g., a facial structure. The 3D mesh representation may include a representation of a single frame of a multi-frame animated sequence.

A graph generation engine receives a 3D representation of a region of skin included in a facial structure and one or more user graph parameters that adjust the operation of one or more components included in the graph generation engine. The graph generation engine samples a set of nodes from the 3D representation, with each node representing a pore in the region of skin. The graph generation engine determines a set of edges based on the set of nodes. For each node in the set of nodes, the graph generation engine selects a predetermined number of nearest neighbor nodes and creates edges from the node to each of the nearest neighbor nodes. Each of these edges represents a candidate wrinkle. The graph generation engine generates a graph that includes the sampled nodes and the generated edges. The graph generation engine traverses each edge in the graph, adjusting a depth for a wrinkle associated with the edge. The depth of a particular wrinkle is expressed by an edge weight associated with the corresponding edge in the graph. The graph generation engine generates a wrinkle graph that includes the samples nodes and the weighted edges representing the wrinkles that begin and end at the nodes.

A map generation engine processes the wrinkle graph to generate a displacement texture map for the 3D representation. The map generation engine analyzes the weighted edges in the wrinkle graph and, via one or more shaders and blenders, calculates displacements determined by the geometries of the wrinkles. The map generation engine further calculates displacements for pores represented by nodes in the wrinkle graph. The calculated displacements may adjust the depth of a pore or stretch the pore. The map generation engine combines the calculated wrinkle and displacements into a displacement texture map.

To improve realism in the displacement texture map, the map generation engine may adjust the location of pores in the displacement texture map via the addition of a small amount of noise. The map generation engine may also add uniform roughness to the entire displacement texture map via the addition of random noise.

As an alternative embodiment to the map generation engine, a binning/shading engine may split all of the wrinkles included in the wrinkle graph into a number of bins based on the orientation of the wrinkles, placing all wrinkles with a similar orientation into the same bin. The binning/shading engine generates pre-computed displacement texture maps for each bin based on the orientation of the wrinkles and an applied neutral, compression, or stretching force. The binning/shading engine generates a per-frame stretch map that includes a map of neutral, compression, or stretching forces applied to a 3D mesh representation. The binning/shading engine processes the pre-computed displacement texture maps and the per-frame stretch map in a fragment shader to generate a per-frame displacement texture map that, when applied to the initial 3D mesh representation, simulates the appearance of skin micro features. The binning/shading engine may generate the displacement texture map more quickly than the map rendering engine, as the binning/shading engine applies pre-computed displacement texture maps to wrinkles rather than having to generate a displacement for each wrinkle individually.

One technical advantage of the disclosed techniques relative to the prior art is that the disclosed techniques accurately model facial micro features under static or dynamic facial expression. Unlike existing techniques that simulate micro features using a noise pattern, the disclosed techniques allow for the realistic representation of structured micro features such as wrinkles. The disclosed techniques also allow for fine artistic controllability of the skin appearance based on user-provided parameters. Further, the disclosed techniques account for anisotropic stretch and compression effects of dynamic facial expressions on facial micro features. Specifically, the disclosed techniques modify the appearance of a facial micro feature based on both the orientation of the micro feature and the directionality of an applied stretching or compressing force. These technical advantages provide one or more technological improvements over prior art approaches.

1. In some embodiments, a computer-implemented method for simulating skin wrinkles comprises receiving a wrinkle graph, wherein the wrinkle graph includes a plurality of nodes associated with a plurality of pores included in a three-dimensional (3D) representation of a facial structure and a plurality of edges associated with a plurality of wrinkles included in the 3D representation of the facial structure, assigning one or more of the plurality of wrinkles associated with edges included in the wrinkle graph to one of a plurality of bins, generating, for each of the bins, a plurality of pre-computed displacement texture maps, generating, based on at least one or more of the plurality of edges and the pre-computed displacement texture maps, a per-frame displacement texture map, and modifying an animation frame based on the per-frame displacement texture map, such that the modified animation frame depicts the plurality of pores and the plurality of wrinkles included in the 3D representation of the facial structure.

2. The computer-implemented method of clause 1, wherein each bin of the plurality of bins is associated with a wrinkle orientation.

3. The computer-implemented method of clauses 1 or 2, wherein assigning an edge of the plurality of edges to one of the plurality of bins is based on an orientation associated with the edge.

4. The computer-implemented method of any of clauses 1-3, wherein generating each of the plurality of pre-computed displacement texture maps is based on a maximal stretch value.

5. The computer-implemented method of any of clauses 1-4, wherein the animation frame is included in an animation sequence, and the maximal stretch value is based on one or more additional animation frames included in the animation sequence.

6. The computer-implemented method of any of clauses 1-5, wherein each edge of the plurality of edges is associated with an edge weight.

7. The computer-implemented method of any of clauses 1-6, wherein modifying the animation frame comprises deforming a 3D mesh representation associated with the animation frame.

8. In some embodiments, one or more non-transitory computer-readable media store instructions that, when executed by one or more processors, cause the one or more processors to perform the steps of receiving a wrinkle graph, wherein the wrinkle graph includes a plurality of nodes associated with a plurality of pores included in a three-dimensional (3D) representation of a facial structure and a plurality of edges associated with a plurality of wrinkles included in the 3D representation of the facial structure, assigning one or more of the plurality of wrinkles associated with edges included in the wrinkle graph to one of a plurality of bins, generating, for each of the bins, a plurality of pre-computed displacement texture maps, generating, based on at least one or more of the plurality of edges and the pre-computed displacement texture maps, a per-frame displacement texture map, and modifying an animation frame based on the per-frame displacement texture map, such that the modified animation frame depicts the plurality of pores and the plurality of wrinkles included in the 3D representation of the facial structure.

9. The one or more non-transitory computer-readable media of clause 8, wherein each bin of the plurality of bins is associated with a wrinkle orientation.

10. The one or more non-transitory computer-readable media of clauses 8 or 9, wherein assigning an edge of the plurality of edges to one of the plurality of bins is based on an orientation associated with the edge.

11. The one or more non-transitory computer-readable media of any of clauses 8-10, wherein generating each of the plurality of pre-computed displacement texture maps is based on a maximal stretch value.

12. The one or more non-transitory computer-readable media of any of clauses 8-11, wherein the animation frame is included in an animation sequence, and the maximal stretch value is based on one or more additional animation frames included in the animation sequence.

13. The one or more non-transitory computer-readable media of any of clauses 8-12, wherein each edge of the plurality of edges is associated with an edge weight.

14. The one or more non-transitory computer-readable media of any of clauses 8-13, wherein modifying the animation frame comprises deforming a 3D mesh representation associated with the animation frame.

15. In some embodiments, a system comprises one or more memories storing instructions and one or more processors for executing the instructions to receive a wrinkle graph, wherein the wrinkle graph includes a plurality of nodes associated with a plurality of pores included in a three-dimensional (3D) representation of a facial structure and a plurality of edges associated with a plurality of wrinkles included in the 3D representation of the facial structure, assign one or more of the plurality of wrinkles associated with edges included in the wrinkle graph to one of a plurality of bins, generate, for each of the bins, a plurality of pre-computed displacement texture maps, generate, based on at least one or more of the plurality of edges and the pre-computed displacement texture maps, a per-frame displacement texture map, and modify an animation frame based on the per-frame displacement texture map, such that the modified animation frame depicts the plurality of pores and the plurality of wrinkles included in the 3D representation of the facial structure.

16. The system of clause 15, wherein each bin of the plurality of bins is associated with a wrinkle orientation.

17. The system of clauses 15 or 16, wherein assigning an edge of the plurality of edges to one of the plurality of bins is based on an orientation associated with the edge.

18. The system of any of clauses 15-17, wherein generating each of the plurality of pre-computed displacement texture maps is based on a maximal stretch value.

19. The system of any of clauses 15-18, wherein the animation frame is included in an animation sequence, and the maximal stretch value is based on one or more additional animation frames included in the animation sequence.

20. The system of any of clauses 15-19, wherein each edge of the plurality of edges is associated with an edge weight.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for simulating skin wrinkles, the computer-implemented method comprising:
   receiving a wrinkle graph, wherein the wrinkle graph includes a plurality of nodes associated with a plurality of pores included in a three-dimensional (3D) representation of a facial structure and a plurality of edges associated with a plurality of wrinkles included in the 3D representation of the facial structure;
   assigning one or more of the plurality of wrinkles associated with edges included in the wrinkle graph to one of a plurality of bins, wherein each bin included in the plurality of bins corresponds to a different predetermined value or range of values associated with a wrinkle characteristic;
   generating, for each of the bins, a plurality of pre-computed displacement texture maps;
   generating, based on at least one or more of the plurality of edges and the pre-computed displacement texture maps, a per-frame displacement texture map; and
   modifying an animation frame based on the per-frame displacement texture map, such that the modified animation frame depicts the plurality of pores and the plurality of wrinkles included in the 3D representation of the facial structure.

2. The computer-implemented method of claim 1, wherein each bin of the plurality of bins corresponds to a different wrinkle orientation value or range of wrinkle orientation values.

3. The computer-implemented method of claim 1, wherein assigning a wrinkle of the plurality of wrinkles to one of the plurality of bins is based at least on an orientation associated with the wrinkle.

4. The computer-implemented method of claim 1, wherein generating each of the plurality of pre-computed displacement texture maps is based on a maximal stretch value.

5. The computer-implemented method of claim 4, wherein the animation frame is included in an animation sequence, and the maximal stretch value is based on one or more additional animation frames included in the animation sequence.

6. The computer-implemented method of claim 1, wherein each edge of the plurality of edges is associated with an edge weight.

7. The computer-implemented method of claim 1, wherein modifying the animation frame comprises deforming a 3D mesh representation associated with the animation frame.

8. One or more non-transitory computer-readable media storing instructions that, when executed by one or more processors, cause the one or more processors to perform the steps of:
   receiving a wrinkle graph, wherein the wrinkle graph includes a plurality of nodes associated with a plurality of pores included in a three-dimensional (3D) representation of a facial structure and a plurality of edges associated with a plurality of wrinkles included in the 3D representation of the facial structure;
   assigning one or more of the plurality of wrinkles associated with edges included in the wrinkle graph to one of a plurality of bins, wherein each bin included in the plurality of bins corresponds to a different predetermined value or range of values associated with a wrinkle characteristic;
   generating, for each of the bins, a plurality of pre-computed displacement texture maps;

generating, based on at least one or more of the plurality of edges and the pre-computed displacement texture maps, a per-frame displacement texture map; and modifying an animation frame based on the per-frame displacement texture map, such that the modified animation frame depicts the plurality of pores and the plurality of wrinkles included in the 3D representation of the facial structure.

9. The one or more non-transitory computer-readable media of claim 8, wherein each bin of the plurality of bins corresponds to a different wrinkle orientation value or range of wrinkle orientation values.

10. The one or more non-transitory computer-readable media of claim 8, wherein assigning a wrinkle of the plurality of wrinkles to one of the plurality of bins is based at least on an orientation associated with the wrinkle.

11. The one or more non-transitory computer-readable media of claim 8, wherein generating each of the plurality of pre-computed displacement texture maps is based on a maximal stretch value.

12. The one or more non-transitory computer-readable media of claim 11, wherein the animation frame is included in an animation sequence, and the maximal stretch value is based on one or more additional animation frames included in the animation sequence.

13. The one or more non-transitory computer-readable media of claim 8, wherein each edge of the plurality of edges is associated with an edge weight.

14. The one or more non-transitory computer-readable media of claim 8, wherein modifying the animation frame comprises deforming a 3D mesh representation associated with the animation frame.

15. A system comprising:
   one or more memories storing instructions; and
   one or more processors for executing the instructions to:
      receive a wrinkle graph, wherein the wrinkle graph includes a plurality of nodes associated with a plurality of pores included in a three-dimensional (3D) representation of a facial structure and a plurality of edges associated with a plurality of wrinkles included in the 3D representation of the facial structure;

assign one or more of the plurality of wrinkles associated with edges included in the wrinkle graph to one of a plurality of bins, wherein each bin included in the plurality of bins corresponds to a different pre-determined value or range of values associated with a wrinkle characteristic;

generate, for each of the bins, a plurality of pre-computed displacement texture maps;

generate, based on at least one or more of the plurality of edges and the pre-computed displacement texture maps, a per-frame displacement texture map; and modify an animation frame based on the per-frame displacement texture map, such that the modified animation frame depicts the plurality of pores and the plurality of wrinkles included in the 3D representation of the facial structure.

16. The system of claim 15, wherein each bin of the plurality of bins corresponds to a different wrinkle orientation value or range of wrinkle orientation values.

17. The system of claim 15, wherein assigning a wrinkle of the plurality of wrinkles to one of the plurality of bins is based at least on an orientation associated with the wrinkle.

18. The system of claim 15, wherein generating each of the plurality of pre-computed displacement texture maps is based on a maximal stretch value.

19. The system of claim 18, wherein the animation frame is included in an animation sequence, and the maximal stretch value is based on one or more additional animation frames included in the animation sequence.

20. The system of claim 15, wherein each edge of the plurality of edges is associated with an edge weight.

* * * * *